US009110800B2

(12) United States Patent
Friedlander et al.

(10) Patent No.: US 9,110,800 B2
(45) Date of Patent: Aug. 18, 2015

(54) PREVENTING CASCADE FAILURES IN COMPUTER SYSTEMS

(71) Applicant: INTERNATIONAL BUSINESS MACHINES CORPORATION, Armonk, NY (US)

(72) Inventors: Robert R. Friedlander, Southbury, CT (US); James R. Kraemer, Santa Fe, NM (US); Justyna M. Nowak, Chesterbrook, PA (US); Elizabeth V. Woodward, Cedar Park, TX (US)

(73) Assignee: International Business Machines Corporarion, Armonk, NY (US)

( * ) Notice: Subject to any disclaimer, the term of this patent is extended or adjusted under 35 U.S.C. 154(b) by 0 days.

(21) Appl. No.: 14/540,218

(22) Filed: Nov. 13, 2014

(65) Prior Publication Data

US 2015/0074464 A1    Mar. 12, 2015

Related U.S. Application Data

(63) Continuation of application No. 13/476,333, filed on May 21, 2012, now Pat. No. 8,930,743.

(51) Int. Cl.
*G06F 11/00* (2006.01)
*G06F 11/07* (2006.01)

(52) U.S. Cl.
CPC .......... *G06F 11/079* (2013.01); *G06F 11/0706* (2013.01)

(58) Field of Classification Search
CPC .............. G06F 11/079; G06F 11/0706; G06F 11/0778; G06F 11/3466; G06F 11/2025
USPC ...................................................... 714/3, 37
See application file for complete search history.

(56) References Cited

U.S. PATENT DOCUMENTS

| 4,665,520 A | 5/1987 | Strom et al. |
| 5,052,043 A | 9/1991 | Gaborski |

(Continued)

FOREIGN PATENT DOCUMENTS

WO    2010000623 A2    1/2010

OTHER PUBLICATIONS

S. Iyer et al., "A Markovian Dependability Model With Cascading Failures", IEEE Transactions on Computers, Vol. 58, No. 9, Sep. 2009, pp. 1238-1249.

(Continued)

*Primary Examiner* — Yair Leibovich
(74) *Attorney, Agent, or Firm* — John R. Pivnichny; Law Office of Jim Boice

(57) ABSTRACT

A computer hardware-implemented method, system, and/or computer program product prevents a cascading failure in a complex stream computer system causing an untrustworthy output from the complex stream computer system. Multiple upstream subcomponents in a complex stream computer system generate multiple outputs, which are used as inputs to a downstream subcomponent, wherein the multiple upstream subcomponents execute upstream computational processes. Each upstream computational process is examined to determine an accuracy of each identified output. An accuracy value is assigned to each of the multiple outputs from the upstream subcomponents, and weighting values are assigned to each of the inputs to the downstream subcomponent. The accuracy values and weighting values are utilized to dynamically adjust inputs to the downstream subcomponent until an output from the downstream subcomponent meets a predefined trustworthiness level.

20 Claims, 3 Drawing Sheets

(56) References Cited

U.S. PATENT DOCUMENTS

| | | |
|---|---|---|
| 6,704,812 B2 | 3/2004 | Bakke et al. |
| 7,379,849 B2 | 5/2008 | Shrivastava et al. |
| 7,613,979 B1 | 11/2009 | Marr et al. |
| 7,711,662 B2 | 5/2010 | Buscema |
| 8,699,607 B2 | 4/2014 | Seller |
| 2005/0283530 A1 | 12/2005 | O'Neal et al. |
| 2006/0271210 A1 | 11/2006 | Subbu et al. |
| 2007/0112723 A1 | 5/2007 | Alvarez et al. |
| 2008/0084294 A1* | 4/2008 | Zhiying et al. .......... 340/539.22 |
| 2010/0268808 A1 | 10/2010 | Chkodrov et al. |
| 2011/0206342 A1 | 8/2011 | Thompson et al. |
| 2011/0320869 A1 | 12/2011 | Gower et al. |

OTHER PUBLICATIONS

International Searching Authority: International Search Report and Written Opinion for International Application No. PCT/IB2013/053664, Mailed October 3, 2013.

UK Intellectual Property Office, GB Patent Application No. 1422582.5-Examination Report under Section 18(3)—mailed Feb. 18, 2015, pp. 1-5.

* cited by examiner

PREVENTING CASCADE FAILURES IN COMPUTER SYSTEMS

BACKGROUND

The present disclosure relates to the field of computers, and specifically to the use of computers when used in cascading operations. Still more particularly, the present disclosure relates to the prevention of cascade failures in cascading operations in complex stream computer systems.

A complex stream computer utilizes software and hardware components that interact with one another, such that a downstream component is reliant on an output from an upstream component in the complex stream computer. Such operations are known as cascading operations, since outputs of upstream operations directly impact downstream operations. This impact causes an upstream failure/fault/error to cascade through the complex stream computer, such that the actual internal cause for a final output error (i.e., a cascading failure in the stream computer) is difficult, if not impossible, to ascertain.

SUMMARY

A computer hardware-implemented method, system, and/or computer program product prevents a cascading failure in a complex stream computer system causing an untrustworthy output from the complex stream computer system. Multiple upstream subcomponents in a complex stream computer system generate multiple outputs, which are used as inputs to a downstream subcomponent, wherein the multiple upstream subcomponents execute upstream computational processes. Each upstream computational process is examined to determine an accuracy of each identified multiple output based on a source of inputs to each upstream computational process and a history of producing predictions that exceed a predetermined level of accuracy. An accuracy value is assigned to each of the multiple outputs from the upstream subcomponents, and weighting values are assigned to each of the inputs to the downstream subcomponent. The accuracy values and weighting values are utilized to dynamically adjust inputs to the downstream subcomponent until an output from the downstream subcomponent meets a predefined trustworthiness level, based on the determined accuracy value of each of the identified multiple outputs and the weighting value of each of the identified multiple inputs to the downstream component.

DETAILED DESCRIPTION

Figure 1:
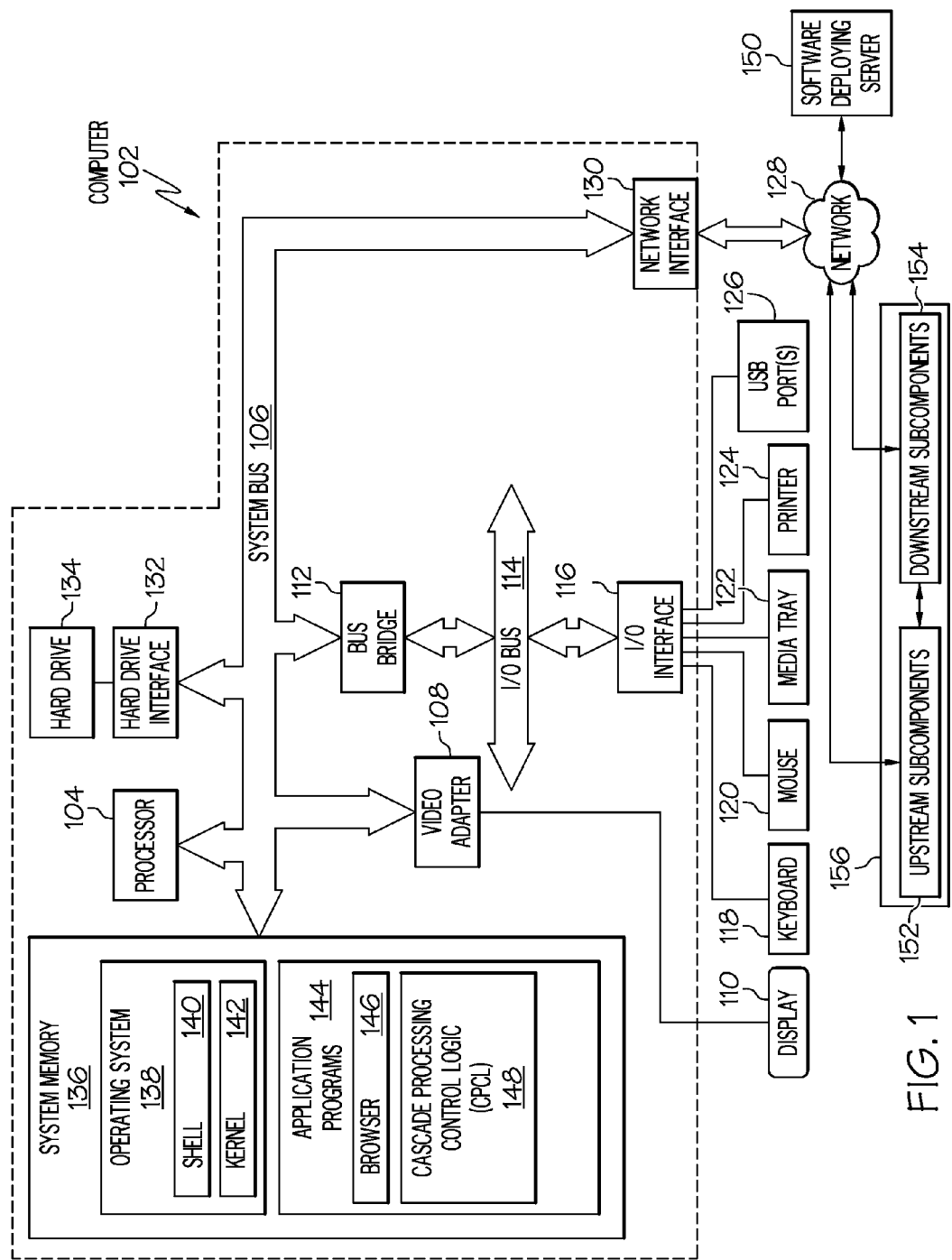
FIG. 1 depicts an exemplary system and network which may be used to implement the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As noted herein, a complex stream computer utilizes software and hardware components that interact with one another, such that a downstream component is reliant on an output from an upstream component in the complex stream computer. Thus, such systems are notoriously difficult to debug. That is, if the output of the entire stream computer fails, (i.e., if the output is an error code, is nonsense, is outside of an acceptable range, etc.), the upstream cause within the complex stream computer is difficult to identify by simply backtracking The present invention presents a novel approach to identifying root causes in such cascade processes.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or complex stream computer system 156.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, as well as complex stream computer system 156, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a cascade processing control logic (CPCL) 148. CPCL 148 includes code for implementing the processes described below, including those described in FIGS. 2-3. In one embodiment, computer 102 is able to download CPCL 148 from software deploying server 150, including in an on-demand basis, wherein the code in CPCL 148 is not downloaded until needed for execution. Note further that, in one embodiment of the present invention, software deploying server 150 performs all of the functions associated with the present invention (including execution of CPCL 148), thus freeing computer 102 from having to use its own internal computing resources to execute CPCL 148.

Figure 2:
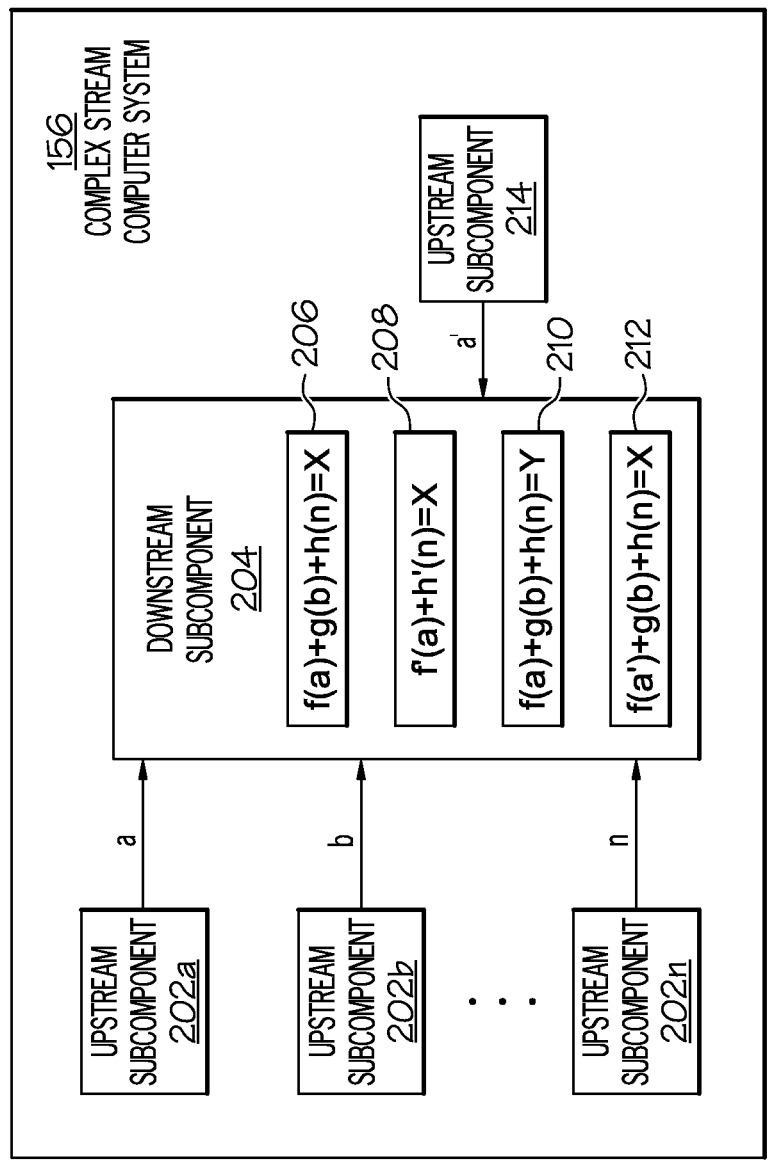
FIG. 2 illustrates detail of a complex stream computer system depicted in FIG. 1.

Complex stream computer system 156 comprises upstream subcomponents 152 and downstream subcomponent(s) 154. The upstream subcomponents 152 execute upstream computational processes that produce outputs, which are subsequently used as inputs to downstream computational processes that are executed in the downstream subcomponent(s) 154. In one embodiment, the upstream subcomponents 152 and downstream subcomponent(s) 154 are each individual, separate hardware entities (e.g., each subcomponent is a separate processor). In another embodiment, upstream subcomponents 152 and downstream subcomponent(s) 154 are software entities that are executed within a same computer hardware system (or within different computer hardware systems). FIG. 2 provides additional detail of complex stream computer system 156. Note that, in one embodiment, the complex stream computer system 156 is actually part of computer 102, such that the complex stream computer system is internal to and self-monitored by computer 102.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

With reference now to FIG. 2, details are shown of complex stream computer system 156 from FIG. 1. Complex stream computer system 156 comprises multiple upstream subcomponents 202a-n (where "n" is an integer). Each of the multiple upstream subcomponents 202a-n utilizes inputs (not shown) to execute upstream processes (e.g., computer program code) to generate an output. For example, upstream subcomponent 202a generates an output a, upstream subcomponent 202b generates an output b, and upstream subcomponent 202n generates an output n. These outputs are utilized as inputs to one or more of the downstream computational processes (e.g., elements 206, 208, 210, 212) in the downstream subcomponent 204.

For example, assume that X represents a prediction of whether a certain crop will be profitable or not, and/or the extent of the profit or loss from the crop (i.e., X=a crop profitability prediction). Also, assume that crop profitability prediction X must meet a predefined trustworthiness level. For example, this predefined trustworthiness level may be a 95% confidence level that the prediction of whether the crop will be profitable or not will be accurate within some predefined range. In one embodiment, this confidence level is historical (i.e., how accurate the prediction has been in the past), based on 1) how reliable, accurate, and/or specific (i.e., falling within a predefined range) the outputs from the upstream subcomponents were, and 2) how critical each of the inputs were to a downstream computational process that was executing within the downstream subcomponent 204.

Thus, in this example, assume that input a is a weather prediction (e.g., precipitation amount, temperatures, etc.) for where and when the crop will be grown. Assume further that input b is a prediction of what interest rates (that the farmer will have to pay when financing equipment, buying seeds, etc.) will be during a predefined time period (e.g., during the planting/growing season). Finally, assume that input n is a crop demand prediction, which predicts how high the demand will be for the crop at harvest time. By inputting all of these factors into computational process 206 (using functions f, g, and h), crop profitability prediction X is generated. In one embodiment, the present invention takes the process further. In this embodiment, a determination is made as to whether X meets the predefined trustworthiness level described herein. In order to make this determination, 1) the quality ("accuracy values") of the inputs is determined; and 2) the criticality ("weighting value") of the input is determined.

With regard to the "accuracy values" of the inputs, each upstream computational process is examined. First, the quality of the source of inputs to these upstream computational processes is examined. For example, if the inputs to the upstream computational process are from known and trusted sources, then the output from that computational process is deemed to be more accurate (i.e., has a higher confidence level of accuracy) than an output that is the result of inputs from unknown, little used, and/or untrusted sources. Similarly, the upstream computational process itself is evaluated. For example, if a particular upstream computational process has a history of producing highly accurate and reliable weather predictions, then the output from that particular upstream computational process will be deemed to be more accurate than the output of another upstream computational process that has a poor history for accurately predicting the weather.

With regard to the "weighting value" of the input, certain inputs to the downstream computational process are more significant/critical than other inputs. For example, assume that the crop profitability prediction X produced by downstream computational process 206 does not meet the requisite predefined trustworthiness level, due to the fact that input b is too inaccurate. However, by using input a and input n in a different downstream computational process 208 (which uses functions f' and h' instead of functions f and h, which are found in downstream computational process 206), a crop profitability prediction X that meets the requisite predefined trustworthiness level is generated. That is, in response to downstream computational process 206 failing to generate a crop profitability prediction X that meets the requisite predefined trustworthiness level, due to the poor quality of input b, downstream computational process 208 is executed, with the resulting crop profitability prediction X that does meet the requisite predefined trustworthiness level.

In one embodiment, no variations of execution of one or more of the functions f(a), g(b), and/or h(n) (using the inputs a, b, n) ever produce a crop profitability prediction X that meets the requisite predefined trustworthiness level. In this embodiment, downstream computational process 210 is executed. Note that while downstream computational process 210 uses the same functions f, g, and/or h as downstream computational process 206, downstream computational process 210 produces a different prediction Y. That is, while execution of the functions f(a)+g(b)+h(n) is unable to produce a reliable crop profitability prediction X, these same functions (or alternatively, other functions—not shown), using inputs a, b, n, are able to produce a crop yield prediction Y (e.g., how much crop will be produced, without predicting whether or not the crop will be profitable), which meets some requisite predefined trustworthiness level.

In another embodiment, again no variations of execution of one or more of the functions f(a), g(b), and/or h(n) (using the inputs a, b, n) ever produce a crop profitability prediction X that meets the requisite predefined trustworthiness level. In this embodiment, alternate downstream computational process 212 is executed. Note that while downstream computational process 210 uses the same functions f, g, and/or h as downstream computational process 206, downstream computational process 210 uses input a' (from upstream subcomponent 214, which executes a different upstream computational process and/or uses different inputs than upstream subcomponent 202a) instead of input a (from upstream subcomponent 202a). By changing the input to function f from a to a', a reliable crop profitability prediction X, which meets the requisite predefined trustworthiness level, is produced.

Note that crop prediction is but one example of downstream computational processes that can utilize the methodology described herein. For example, assume that a user desires to diagnose a disease in a patient. In this example, assume that input a is a first lab result analysis. This first lab result analysis may be a simple yes/no lab result. However, the lab may have a good reputation or a bad reputation for accuracy, and thus the quality ("accuracy values") of lab results from that lab may vary. Similarly, the first lab result analysis may be a human and/or mechanical analysis of a sample (e.g., an X-ray report, a DNA analysis, a microscopic examination of a blood/stool sample, etc.). As such, the quality of the first lab result analysis is dependent on the quality of the persons/equipment performing the analysis.

Continuing with the disease diagnosis example, input b may be a second lab result analysis, which also has its own accuracy value. Input n may be a patient history analysis, which is the result of data mining of a patient's medical chart, etc. Again, the quality of these analyses depends on the skill level of the persons performing the analysis, the quality of the inputs used by the respective upstream computational processes, and/or the quality of the hardware/software used in the analyses. As with the crop prediction described above, if the disease diagnosis X does not meet a predefined trustworthiness level (e.g., using a downstream computational process 206), then another downstream computational process (e.g., downstream computational process 208) may be executed; another diagnosis Y (i.e., determining that a patient has disease "y" instead of disease "x") may be generated (e.g., using downstream computational process 210); and/or another input (e.g., a' from another lab) may be used to generate the originally desired disease diagnosis X.

Figure 3:
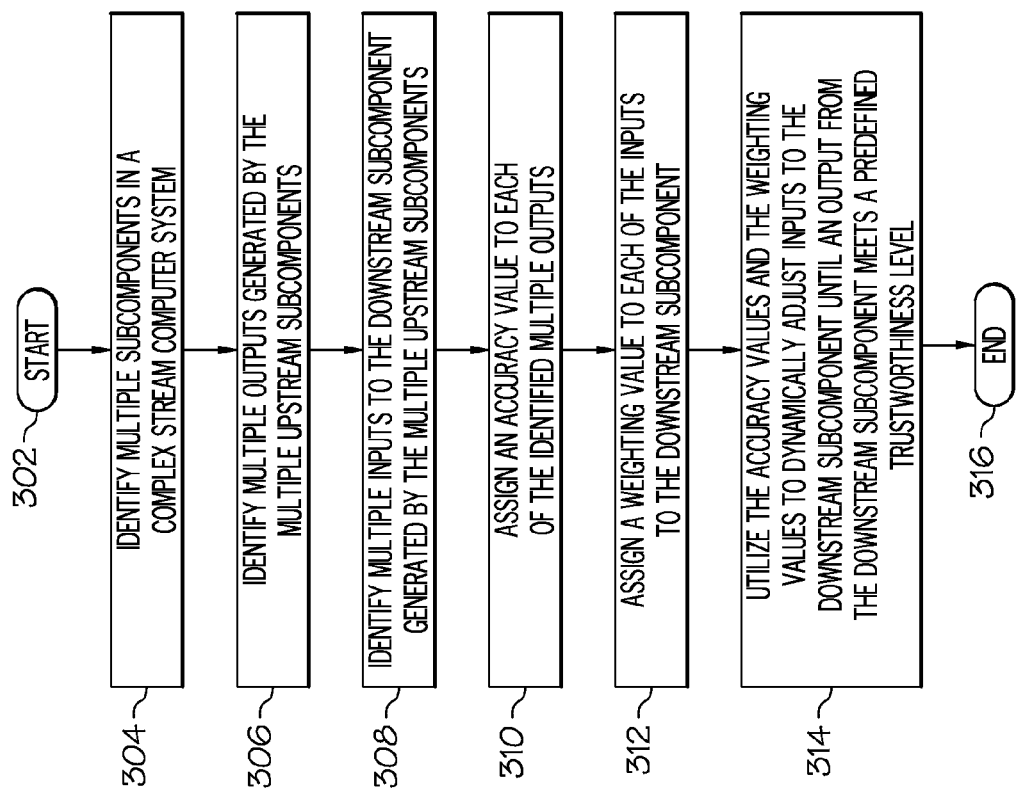
FIG. 3 is a high level flow chart of one or more exemplary steps taken by a processor or other computer hardware to prevent a cascading failure in a complex stream computer system.

With reference now to FIG. 3, a high level flow chart of one or more exemplary steps taken by a processor or other computer hardware to prevent a cascading failure (i.e., a cascading failure that results in an untrustworthy output from the complex stream computer system) is presented. After initiator block 302, a processor receives a first set of binary data that identifies multiple subcomponents in a complex stream computer system (block 304). These identified multiple subcomponents comprise both multiple upstream subcomponents (e.g., upstream subcomponents 202*a-n* shown in FIG. 2) and at least one downstream subcomponent (e.g., downstream subcomponent 204 shown in FIG. 2). As described in block 306, the processor receives a second set of binary data that identifies multiple outputs (e.g., a, b, n shown in FIG. 2) generated by the multiple upstream subcomponents.

As described in block 308, the processor receives a third set of binary data that identifies multiple inputs to the downstream subcomponent. These identified multiple inputs to the downstream subcomponent are the identified multiple outputs generated by the multiple upstream subcomponents, and the identified multiple inputs are inputs to a downstream computational process (e.g., one of elements 206, 208, 210, 212 depicted in FIG. 2) that is executed by the downstream subcomponent.

As described in block 310, computer hardware (e.g., computer 102 and/or downstream subcomponent(s) 154 shown in FIG. 1) generate accuracy values, for each of the outputs from the upstream subcomponents, by assigning an accuracy value to each of the identified multiple outputs. The accuracy value describes a confidence level of an accuracy of each of the identified multiple outputs. As described herein, each of the identified multiple outputs are created by a separate upstream computational process in separate upstream subcomponents from the multiple upstream subcomponents.

As described in block 312, computer hardware (e.g., computer 102 and/or downstream subcomponent(s) 154 shown in FIG. 1) generates weighting values by assigning a weighting value to each of the identified multiple inputs to the downstream subcomponent. As described herein, the weighting value describes a criticality level of each of the identified multiple inputs when executing the downstream computational process in the downstream subcomponent. For example, the input b was deemed to be non-critical in FIG. 2, since a valid result X could be generated by using the downstream computational process 208 instead of downstream computational process 206.

As described in block 314, computer hardware (e.g., computer 102 and/or downstream subcomponent(s) 154 shown in FIG. 1) then utilizes the accuracy values and the weighting values to dynamically adjust which of the identified multiple inputs are input to the downstream subcomponent until an output from the downstream subcomponent meets a predefined trustworthiness level. As described in FIG. 2, this dynamic adjustment may change which inputs are used by a same downstream computational process (e.g., element 206 or 212 in FIG. 2), and/or the dynamic adjustment may change which algorithm (e.g., element 206 or 208 or 210 in FIG. 2) is used. That is, in one embodiment, in response to the accuracy values failing to cause the output of the downstream computational process to meet the predefined trustworthiness level, the computer hardware replaces the downstream computational process in the downstream subcomponent with an alternate downstream computational process. The downstream subcomponent then reutilizes the accuracy values and the weighting values to dynamically adjust inputs to the alternate downstream computation process until an output from the downstream subcomponent (e.g., using the alternate downstream subcomponent process) meets the predefined trustworthiness level. For example, inputs to alternate downstream computational process 212 shown in FIG. 2 may be dynamically adjusted by using input a' instead of input a with function f in the alternate computational process 212.

The process ends at terminator block 316.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer hardware-implemented method of preventing a cascading failure in a complex stream computer system, wherein a cascading failure results in an untrustworthy output from the complex stream computer system, and wherein the computer hardware-implemented method comprises:

receiving a first set of binary data that identifies multiple subcomponents in a complex stream computer system, wherein the identified multiple subcomponents comprise multiple upstream subcomponents and a downstream subcomponent, and wherein the multiple upstream subcomponents execute upstream computational processes;

receiving a second set of binary data that identifies multiple outputs generated by the multiple upstream subcomponents;

receiving a third set of binary data that identifies multiple inputs to the downstream subcomponent, wherein the identified multiple inputs to the downstream subcomponent are the identified multiple outputs generated by the multiple upstream subcomponents, and wherein the identified multiple inputs are inputs to a downstream computational process that is executed by the downstream subcomponent;

examining, by computer hardware, each of the upstream computational processes to determine an accuracy of each of the identified multiple outputs based upon:
 a source of inputs to each of the upstream computational processes; and
 a history of each of the upstream computational processes for producing predictions that exceed a predetermined level of accuracy;

generating, by computer hardware, accuracy values by assigning a determined accuracy value to each of the identified multiple outputs, wherein the determined accuracy value describes a confidence level of an accuracy of each of the identified multiple outputs, and wherein each of the identified multiple outputs are created by a separate upstream computational process in separate upstream subcomponents from the multiple upstream subcomponents;

generating, by the computer hardware, weighting values by assigning a weighting value to each of the identified multiple inputs to the downstream subcomponent, wherein the weighting value describes a criticality level of each of the identified multiple inputs when executing the downstream computational process in the downstream subcomponent; and utilizing, by the computer hardware, the determined accuracy values and the weighting values to dynamically adjust which of the identified multiple inputs are used by the downstream subcomponent until an output from the downstream subcomponent meets a predefined trustworthiness level, wherein a trustworthiness of the output from the downstream subcomponent is based on the determined accuracy value of each of the identified multiple outputs and the weighting value of each of the identified multiple inputs to the downstream subcomponent.

2. The computer hardware-implemented method of claim 1, wherein the identified multiple subcomponents of the complex stream computer system are hardware subcomponents.

3. The computer hardware-implemented method of claim 2, further comprising:

in response to the accuracy values and the output from the downstream subcomponent failing to meet the predefined trustworthiness level, the computer hardware replacing the downstream computational process in the downstream subcomponent with an alternate downstream computational process; and reutilizing, by the downstream subcomponent, the accuracy values and the weighting values to dynamically adjust inputs to the alternate downstream computational process until execution of the alternate downstream computational process results in an output that meets the predefined trustworthiness level.

4. The computer hardware-implemented method of claim 2, further comprising:

determining, by the computer hardware, that one of the identified multiple outputs is a failing output that fails to meet the accuracy values;

determining, by the computer hardware, that executing an alternate downstream computational process without the failing output results in the output from the downstream subcomponent meeting the predefined trustworthiness level; and executing, by the downstream subcomponent, the alternate downstream computational process without the failing output.

5. The computer hardware-implemented method of claim 1, wherein the identified multiple subcomponents of the complex stream computer system are software subcomponents.

6. The computer hardware-implemented method of claim 1, further comprising:

receiving, by the downstream subcomponent, a weather prediction as a first input, wherein the first input is generated by a first upstream subcomponent from the multiple upstream subcomponents;

receiving, by the downstream subcomponent, an interest rate prediction as a second input, wherein the second input is generated by a second upstream subcomponent from the multiple upstream subcomponents;

receiving, by the downstream subcomponent, a crop demand prediction as a third input, wherein the third input is generated by a third upstream subcomponent from the multiple upstream subcomponents; and generating, by the downstream subcomponent, a crop profitability prediction for a crop based on the weather prediction, the interest rate prediction, and the crop demand prediction, wherein the crop profitability prediction meets the predefined trustworthiness level.

7. The computer hardware-implemented method of claim 1, further comprising:
- receiving, by the downstream subcomponent, a first lab test analysis as a first input, wherein the first input is generated by a first upstream subcomponent from the multiple upstream subcomponents;
- receiving, by the downstream subcomponent, a second lab test analysis as a second input, wherein the second input is generated by a second upstream subcomponent from the multiple upstream subcomponents;
- receiving, by the downstream subcomponent, a patient history analysis as a third input, wherein the third input is generated by a third upstream subcomponent from the multiple upstream subcomponents; and
- generating, by the downstream subcomponent, a disease diagnosis based on the first lab test analysis, the second lab test analysis, and the patient history analysis, wherein the disease diagnosis meets the predefined trustworthiness level.

8. A computer program product for preventing a cascading failure in a complex stream computer system, wherein a cascading failure results in an untrustworthy output from the complex stream computer system, and wherein the computer program product comprises:
- a non-transitory computer readable storage medium;
- first program instructions to identify multiple subcomponents in a complex stream computer system, wherein the identified multiple subcomponents comprise multiple upstream subcomponents and a downstream subcomponent, and wherein the multiple upstream subcomponents execute upstream computational processes;
- second program instructions to identify multiple outputs generated by the multiple upstream subcomponents;
- third program instructions to identify multiple inputs to the downstream subcomponent, wherein the identified multiple inputs to the downstream subcomponent are the identified multiple outputs generated by the multiple upstream subcomponents, and wherein the identified multiple inputs are inputs to a downstream computational process that is executed by the downstream subcomponent;
- fourth program instructions to examine each of the upstream computational processes to determine an accuracy of each of the identified multiple outputs based upon:
  - a source of inputs to each of the upstream computational processes; and
  - a history of each of the upstream computational processes for producing predictions that exceed a predetermined level of accuracy;
- fifth program instructions to generate accuracy values by assigning an accuracy value to each of the identified multiple outputs, wherein the accuracy value describes a confidence level of an accuracy of each of the identified multiple outputs, and wherein each of the identified multiple outputs are created by a separate upstream computational process in separate upstream subcomponents from the multiple upstream subcomponents;
- sixth program instructions to generate weighting values by assigning a weighting value to each of the identified multiple inputs to the downstream subcomponent, wherein the weighting value describes a criticality level of each of the identified multiple inputs when executing the downstream computational process in the downstream subcomponent;
- seventh program instructions to utilize the accuracy values and the weighting values to dynamically adjust which of the identified multiple inputs are used by the downstream subcomponent until an output from the downstream subcomponent meets a predefined trustworthiness level, wherein a trustworthiness of the output from the downstream subcomponent is based on the accuracy value of each of the identified multiple outputs and the weighting value of each of the identified multiple inputs to the downstream subcomponent; and wherein the first, second, third, fourth, fifth, sixth, and seventh program instructions are stored on the non-transitory computer readable storage medium.

9. The computer program product of claim 8, wherein the identified multiple subcomponents of the complex stream computer system are hardware subcomponents.

10. The computer program product of claim 9, further comprising:
- eighth program instructions to, in response to the accuracy values and the output from the downstream subcomponent failing to meet the predefined trustworthiness level, replace the downstream computational process in the downstream subcomponent with an alternate downstream computational process; and
- ninth program instructions to reutilize the accuracy values and the weighting values to dynamically adjust inputs to the alternate downstream computational process until execution of the alternate downstream computational process results in an output that meets the predefined trustworthiness level; and wherein the eighth and ninth program instructions are stored on the non-transitory computer readable storage medium.

11. The computer program product of claim 9, further comprising:
- eighth program instructions to determine that one of the identified multiple outputs is a failing output that fails to meet the accuracy values;
- ninth program instructions to determine that executing an alternate downstream computational process without the failing output results in the output from the downstream subcomponent meeting the predefined trustworthiness level; and
- tenth program instructions to execute the alternate downstream computational process without the failing output; and wherein the eighth, ninth, and tenth program instructions are stored on the non-transitory computer readable storage medium.

12. The computer program product of claim 8, wherein the identified multiple subcomponents of the complex stream computer system are software subcomponents.

13. The computer program product of claim 8, further comprising:
- eighth program instructions to receive a weather prediction as a first input, wherein the first input is generated by a first upstream subcomponent from the multiple upstream subcomponents;
- ninth program instructions to receive an interest rate prediction as a second input, wherein the second input is generated by a second upstream subcomponent from the multiple upstream subcomponents;
- tenth program instructions to receive a crop demand prediction as a third input, wherein the third input is generated by a third upstream subcomponent from the multiple upstream subcomponents; and
- eleventh program instructions to generate a crop profitability prediction for a crop based on the weather prediction, the interest rate prediction, and the crop demand prediction, wherein the crop profitability prediction meets the predefined trustworthiness level; and wherein the eighth, ninth, tenth, and eleventh program instructions are stored on the non-transitory computer readable storage medium.

14. The computer program product of claim 8, further comprising:
eighth program instructions to receive a first lab test analysis as a first input, wherein the first input is generated by a first upstream subcomponent from the multiple upstream subcomponents;
ninth program instructions to receive a second lab test analysis as a second input, wherein the second input is generated by a second upstream subcomponent from the multiple upstream subcomponents;
tenth program instructions to receive a patient history analysis as a third input, wherein the third input is generated by a third upstream subcomponent from the multiple upstream subcomponents; and
eleventh program instructions to generate a disease diagnosis based on the first lab test analysis, the second lab test analysis, and the patient history analysis, wherein the disease diagnosis meets the predefined trustworthiness level; and wherein
the eighth, ninth, tenth, and eleventh program instructions are stored on the non-transitory computer readable storage medium.

15. A system comprising:
a hardware processor, a computer readable memory, and a non-transitory computer readable storage medium;
first program instructions to identify multiple subcomponents in a complex stream computer system, wherein the identified multiple subcomponents comprise multiple upstream subcomponents and a downstream subcomponent, and wherein the multiple upstream subcomponents execute upstream computational processes;
second program instructions to identify multiple outputs generated by the multiple upstream subcomponents;
third program instructions to identify multiple inputs to the downstream subcomponent, wherein the identified multiple inputs to the downstream subcomponent are the identified multiple outputs generated by the multiple upstream subcomponents, and wherein the identified multiple inputs are inputs to a downstream computational process that is executed by the downstream subcomponent;
fourth program instructions to examine each of the upstream computational processes to determine an accuracy of each of the identified multiple outputs based upon:
a source of inputs to each of the upstream computational processes; and
a history of each of the upstream computational processes for producing predictions that exceed a predetermined level of accuracy;
fifth program instructions to generate accuracy values by assigning an accuracy value to each of the identified multiple outputs, wherein the accuracy value describes a confidence level of an accuracy of each of the identified multiple outputs, and wherein each of the identified multiple outputs are created by a separate upstream computational process in separate upstream subcomponents from the multiple upstream subcomponents;
sixth program instructions to generate weighting values by assigning a weighting value to each of the identified multiple inputs to the downstream subcomponent, wherein the weighting value describes a criticality level of each of the identified multiple inputs when executing the downstream computational process in the downstream subcomponent;
seventh program instructions to utilize the accuracy values and the weighting values to dynamically adjust which of the identified multiple inputs are used by the downstream subcomponent until an output from the downstream subcomponent meets a predefined trustworthiness level, wherein a trustworthiness of the output from the downstream subcomponent is based on the accuracy value of each of the identified multiple outputs and the weighting value of each of the identified multiple inputs to the downstream subcomponent; and wherein
the first, second, third, fourth, fifth, sixth, and seventh program instructions are stored on the non-transitory computer readable storage medium for execution by the hardware processor via the computer readable memory.

16. The system of claim 15, wherein the identified multiple subcomponents of the complex stream computer system are hardware subcomponents.

17. The system of claim 16, further comprising:
eighth program instructions to, in response to the accuracy values and the output from the downstream subcomponent failing to meet the predefined trustworthiness level, replace the downstream computational process in the downstream subcomponent with an alternate downstream computational process; and
ninth program instructions to reutilize the accuracy values and the weighting values to dynamically adjust inputs to the alternate downstream computational process until execution of the alternate downstream computational process results in an output that meets the predefined trustworthiness level; and wherein
the eighth and ninth program instructions are stored on the non-transitory computer readable storage medium for execution by the hardware processor via the computer readable memory.

18. The system of claim 16, further comprising:
eighth program instructions to determine that one of the identified multiple outputs is a failing output that fails to meet the accuracy values;
ninth program instructions to determine that executing an alternate downstream computational process without the failing output results in the output from the downstream subcomponent meeting the predefined trustworthiness level; and
tenth program instructions to execute the alternate downstream computational process without the failing output; and wherein
the eighth, ninth, and tenth program instructions are stored on the non-transitory computer readable storage medium for execution by the hardware processor via the computer readable memory.

19. The system of claim 15, further comprising:
eighth program instructions to receive a weather prediction as a first input, wherein the first input is generated by a first upstream subcomponent from the multiple upstream subcomponents;
ninth program instructions to receive an interest rate prediction as a second input, wherein the second input is generated by a second upstream subcomponent from the multiple upstream subcomponents;
tenth program instructions to receive a crop demand prediction as a third input, wherein the third input is generated by a third upstream subcomponent from the multiple upstream subcomponents; and eleventh program instructions to generate a crop profitability prediction for a crop based on the weather prediction, the interest rate prediction, and the crop demand prediction, wherein the crop profitability prediction meets the predefined trustworthiness level; and wherein the eighth, ninth, tenth, and eleventh program instructions are stored on the non-transitory computer readable storage medium for execution by the hardware processor via the computer readable memory.

20. The system of claim 15, further comprising:
eighth program instructions to receive a first lab test analysis as a first input, wherein the first input is generated by a first upstream subcomponent from the multiple upstream subcomponents;
ninth program instructions to receive a second lab test analysis as a second input, wherein the second input is generated by a second upstream subcomponent from the multiple upstream subcomponents;
tenth program instructions to receive a patient history analysis as a third input, wherein the third input is generated by a third upstream subcomponent from the multiple upstream subcomponents; and
eleventh program instructions to generate a disease diagnosis based on the first lab test analysis, the second lab test analysis, and the patient history analysis, wherein the disease diagnosis meets the predefined trustworthiness level; and wherein the eighth, ninth, tenth, and eleventh program instructions are stored on the non-transitory computer readable storage medium for execution by the hardware processor via the computer readable memory.

* * * * *